United States Patent [19]
Avakian et al.

[11] Patent Number: 5,814,702
[45] Date of Patent: Sep. 29, 1998

[54] ELASTOMER COMPOSITION AND THERMOPLASTIC RESIN COMPOSITION MODIFIED THEREWITH

[75] Inventors: Roger W. Avakian; Roman W. Wypart, both of Parkersburg, W. Va.

[73] Assignee: General Electric Company, Pittsfield, Mass.

[21] Appl. No.: 604,039

[22] Filed: Feb. 20, 1996

[51] Int. Cl.⁶ .............................. C08L 53/02; C08L 51/04
[52] U.S. Cl. ................................................. 525/71; 525/68
[58] Field of Search .................................................. 525/71

[56] References Cited

U.S. PATENT DOCUMENTS

| | | | |
|---|---|---|---|
| 3,497,572 | 2/1970 | Childers et al. | |
| 3,975,460 | 8/1976 | Davison et al. | |
| 4,361,675 | 11/1982 | Tan | 525/71 |
| 4,968,748 | 11/1990 | Thompson | 525/92 |
| 5,378,760 | 1/1995 | Modic et al. | 525/71 |
| 5,395,890 | 3/1995 | Nakano et al. | |

FOREIGN PATENT DOCUMENTS

| | | | |
|---|---|---|---|
| 815102 | 6/1969 | Canada. | |
| 1166385 | 10/1967 | European Pat. Off.. | |
| 1428974 | 3/1976 | European Pat. Off.. | |
| 20 43 434 | 3/1971 | Germany. | |
| 195 07 606 | 9/1995 | Germany. | |
| 58-132033 | 8/1983 | Japan | 525/71 |
| 58-164624 | 9/1983 | Japan | 525/71 |
| 059659 | 3/1987 | Japan | 525/71 |
| 9501400 | 1/1995 | WIPO. | |

OTHER PUBLICATIONS

Derwent Abstract of JP75006222.

*Primary Examiner*—David Buttner

[57] ABSTRACT

An elastomer composition includes a vinyl aromatic-conjugated diene block copolymer; and a high rubber graft copolymer and a thermoplastic resin composition includes a thermoplastic resin modified with the elastomer composition.

19 Claims, No Drawings

ELASTOMER COMPOSITION AND THERMOPLASTIC RESIN COMPOSITION MODIFIED THEREWITH

FIELD OF THE INVENTION

The present invention relates to elastomer compositions and to thermoplastic resin compositions modified therewith and, more particularly, to elastomeric blends of graft copolymer and block copolymers and to thermoplastic resin compositions modified therewith.

BACKGROUND OF THE INVENTION

U.S. Pat. No. 3,975,460 (Davidson et al) discloses polymeric blends of acrylonitrile-butadiene-styrene ("ABS") graft copolymers with selectively hydrogenated styrene-conjugated diene block copolymers that are said to exhibit improved processability and high tensile strength.

JP 75006222 discloses a coating composition that comprises a mixture of from 85–95 percent by weight ("wt %") ABS copolymer and 5–15 wt % styrene-butadiene block copolymer having a styrene content of 30–70 wt %.

GB 1,428,974 discloses a blend of a suspension polymerized ABS copolymer and a styrene-butadiene-styrene block copolymer.

The above-disclosed compositions have relatively low rubber content and the compositions are deficient with respect to their elastomeric properties. There is now a need for thermoplastic elastomer compositions that exhibit improved properties, e.g., relatively low hardness and high elongation.

SUMMARY OF THE INVENTION

A first aspect of the present invention is directed to an elastomer composition that comprises:
  (a) a vinyl aromatic-conjugated diene block copolymer; and
  (b) at least 5 weight percent, based on the total weight of the elastomer composition, of a high rubber graft copolymer, wherein said graft copolymer comprises:
    (i) from 60 percent by weight to 95 percent by weight of a rubbery polymeric substrate having a glass transition temperature of less than 0° C. and comprising repeating units derived from one or more monoethylenically unsaturated monomers; and
    (ii) from 5 percent by weight to 40 percent by weight of a rigid polymeric superstrate having a glass transition temperature of greater than or equal to 0° C. and comprising repeating units derived from one or more monomers selected from the group consisting of $(C_1-C_{12})$alkyl (meth)acrylate monomers, vinyl aromatic monomers and monoethylenically unsaturated nitrile monomers, wherein at least a portion of the rigid polymeric superstrate is grafted to the rubbery polymeric substrate.

A second aspect of the present invention is directed to a thermoplastic resin composition that comprises:
  (1) from 60 to 98 percent by weight of a thermoplastic resin having repeating units derived from one or more monomers selected from the group consisting of propylene and 1-methyl pentene; and
  (2) from 2 to 40 percent by weight of an elastomer composition that comprises:
    (a) a vinyl aromatic-conjugated diene block copolymer; and
    (b) at least 5 weight percent, based on the total weight of the elastomer composition, of a high rubber graft copolymer, wherein said graft copolymer comprises:
      (i) from 60 percent by weight to 95 percent by weight of a rubbery polymeric substrate having a glass transition temperature of less than 0° C. and comprising repeating units derived from one or more monoethylenically unsaturated monomers; and
      (ii) from 5 percent by weight to 40 percent by weight of a rigid polymeric superstrate having a glass transition temperature of greater than or equal to 0° C. and comprising repeating units derived from one or more monomers selected from the group consisting of $(C_1-C_{12})$alkyl (meth)acrylate monomers, vinyl aromatic monomers and monoethylenically unsaturated nitrile monomers, wherein at least a portion of the rigid polymeric superstrate is grafted to the rubbery polymeric substrate.

The elastomer composition of the present invention exhibits relatively low hardness and relatively high elongation, as well as improved tear and tensile properties, and the thermoplastic resin composition of the present invention exhibits improved impact properties and improved abrasion resistance.

DETAILED DESCRIPTION OF THE INVENTION

I. Elastomer Composition

In a preferred embodiment, the elastomer composition of the present invention comprises and from 20 to 80 wt %, more preferably 30 to 70 wt %, and even more preferably 40 to 70 wt %, of the vinyl aromatic-conjugated diene block copolymer and from 20 to 80 wt %, more preferably 30 to 70 wt %, and even more preferably 30 to 60 wt %, of the graft copolymer.

A. Vinyl Aromatic-Conjugated Diene Block Copolymer

In a preferred embodiment, the vinyl aromatic-conjugated diene block copolymers is one represented by formula 1 or 2 as set forth below:

   (1)

   (2)

wherein:
  A is a block of repeating units derived from one or more vinyl aromatic monomers and has a number average molecular weight of from 1,000 to 100,000; and
  B is a block of repeating units derived from a conjugated diene monomer and has a number average molecular weight of from 10,000 to 500,000.

In a more highly preferred embodiment, the "A" blocks of the block copolymer have a number average molecular weight from 2,000 to 50,000 or, even more preferably from 10,000 to 40,000 and, independently, the "B" blocks of the block copolymer have a number average molecular weight from 20,000 to 250,000 or, even more preferably, from 50,000 to 200,000.

Suitable vinyl aromatic monomers include, e.g., styrene and substituted styrenes having one or more alkyl, alkoxyl, hydroxyl or halo substituent group attached to the aromatic ring, including, e.g., α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene; and, vinyl-substituted condensed aromatic ring structures, such as, e.g., vinyl napthalene, vinyl anthracene; as well as mixtures of vinyl aromatic monomers. In a preferred embodiment, the vinyl aromatic monomer of the vinyl aromatic-conjugated diene block copolymer is styrene or α-methyl styrene.

Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4,-hexadiene, dichlorobutadiene, bromobutadiene and dibromobutadiene as well as mixtures of conjugated diene monomers. In a preferred embodiment, the conjugated diene monomer of the vinyl aromatic-conjugated diene block copolymer is 1,3-butadiene.

The "B" blocks of the block copolymer may include residual unsaturated sites or may be substantially completely saturated, e.g., by hydrogenation subsequent to polymerization. In a preferred embodiment, the vinyl aromatic-conjugated diene block has a low amount of residual unsaturation, e.g., less than 20%, more preferably less than 90% and even more preferably less than 95% unsaturation.

Suitable vinyl aromatic-conjugated diene block copolymers, e.g., polystyrene-polybutadiene block copolymers, polystyrene-polybutadiene-polystyrene block copolymers and polystyrene-isoprene-polystyrene block copolymers, polystyrene-poly(ethylene-butylene)-polystyrene block copolymers (i.e., hydrogenated polystyrene-polybutadiene-polystyrene block copolymers) and methods of making vinyl aromatic-conjugated diene block copolymers are known in the art and such copolymers are commercially available, e.g., KRATON™ D series rubbers and KRATON™ G series hydrogenated rubbers from Shell Chemical Company.

In a preferred embodiment, the vinyl aromatic-conjugated diene block copolymer is a polystyrene-polybutadiene block copolymer, a polystyrene-polybutadiene-polystyrene block copolymer or a polystyrene-poly(ethylene-butylene)-polystyrene block copolymer.

B. Graft Copolymer

In a preferred embodiment, the rubbery polymeric substrate has a glass transition temperature ("Tg") of less than −20° C. As referred to herein, the $T_g$ of a polymer is the $T_g$ value of polymer as measured by differential scanning calorimetry (heating rate 20° C./minute, $T_g$ value determined at inflection point).

In a preferred embodiment, the graft copolymer comprises from 65 wt % to 90 wt % and even more preferably, from 65 wt % to 80 wt %, of the rubbery polymeric substrate and from 10 wt % to 35 wt % and even more preferably, from 20 wt % to 35 wt %, of the rigid polymeric superstrate.

i. Rubbery Polymeric Substrate

As used herein, the terminology "monoethylenically unsaturated" means having a single site of ethylenic unsaturation per molecule. In a preferred embodiment, the rubbery polymeric substrate comprises repeating units derived from one or more monoethylenically unsaturated monomers selected from conjugated diene monomers, non-conjugated diene monomers, $(C_1-C_{12})$alkyl acrylate monomers and vinyl aromatic monomers.

Suitable vinyl aromatic monomers and conjugated diene monomers are those disclosed above in the description of the vinyl aromatic-conjugated diene block copolymer of the present invention. Suitable non-conjugated diene monomers include, e.g., ethylidene norbornene, dicyclopentadiene, hexadiene or phenyl norbornene. As used herein, the term "$(C_2-C_8)$olefin monomers" means a compound having from 2 to 8 carbon atoms per molecule and having a single site of ethylenic unsaturation per molecule. Suitable $(C_2-C_8)$olefin monomers include, e.g., ethylene, propene, 1-butene, 1-pentene, heptene. As used herein, the term "$(C_1-C_{12})$ alkyl" means a straight or branched alkyl substituent group having from 1 to 12 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl and dodecyl. Suitable $(C_1-C_{12})$alkyl acrylates include, e.g., ethyl acrylate, butyl acrylate, iso-pentyl acrylate, n-hexyl acrylate, 2-ethyl hexyl acrylate. As used herein, the term "monoethylenically unsaturated nitrile monomer" means an acyclic compound that includes a single nitrile group and a single site of ethylenic unsaturation per molecule and includes, e.g., acrylonitrile, methacrylonitrile.

In a preferred embodiment, the rubbery polymeric substrate comprises from 30 to 90 wt % repeating units derived from one or more conjugated diene monomers and from 10 to 70 wt % repeating units derived from one or more monomers selected from vinyl aromatic monomers and monoethylenically unsaturated nitrile monomers.

The rubbery polymeric substrate may, optionally, include a minor amount, e.g., up to 5 wt %, of repeating units derived from a polyethylenically unsaturated "crosslinking" monomer, e.g., butylene diacrylate, divinyl benzene, butene diol dimethacrylate, trimethylolpropane tri(meth)acrylate. As used herein, the term "polyethylenically unsaturated" means having two or more sites of ethylenic unsaturation per molecule.

The rubbery polymeric may, particularly in those embodiments wherein the rubbery substrate has repeating units derived from alkyl (meth)acrylate monomers, include a minor amount, e.g., up to 3 wt % of repeating units derived from a polyethylenically unsaturated "graftlinking" monomer, e.g., allyl methacrylate, diallyl maleate, triallyl cyanurate, wherein the sites of ethylenic unsaturation have substantially different reactivities from the monoethylenically unsaturated monomers from which the respective substrate or superstrate is derived.

In a first highly preferred embodiment, the substrate comprises repeating units derived from one or more conjugated diene monomers, such as, e.g., a substantially homopolymeric polybutadiene rubber.

In a second highly preferred embodiment, the substrate comprises repeating units derived from one or more conjugated diene monomers and one or more copolymerizable comonomers selected from vinyl aromatic monomers and monoethylenically unsaturated nitrile monomers, such as, e.g., styrene-butadiene copolymers, acrylonitrile-butadiene copolymers and styrene-butadiene-acrylonitrile copolymers. In a very highly preferred embodiment, the substrate comprises from 60 to 95 wt % repeating units derived from one or more conjugated diene monomers.

In a third highly preferred embodiment, the substrate comprises repeating units derived from one or more $(C_1-C_{12})$alkyl acrylate monomers. In a more highly preferred embodiment, the rubbery polymeric substrate comprises from 40 to 95 wt % repeating units derived from one or more $(C_1-C_{12})$alkyl acrylate monomers, more preferably from one or more monomers selected from ethyl acrylate, butyl acrylate and n-hexyl acrylate.

In a fourth highly preferred embodiment, the substrate comprises first repeating units derived from one or more olefin monomers and second repeating units derived from one or more non-conjugated diene monomers, such as, e.g., an ethylene/propylene copolymers, ethylene/propylene/non-conjugated diene monomer terpolymers.

Suitable rubbery polymeric substrates are made by known processes, e.g., emulsion polymerization and mass polymerization.

In a preferred embodiment, the rubbery polymeric substrate is made by aqueous emulsion polymerization in the presence of a free radical initiator, e.g., an organic peroxide or persulfate initiator or a redox initiator system, and, optionally, in the presence of a chain transfer agent, e.g., an alkyl mercaptan. In a preferred embodiment, the emulsion polymerized rubbery polymeric substrate is in particulate form and has a weight average particle size of 50 to 1000 nanometers (nm), more preferably, of from 50 to 600 nm, as measured by light transmission. The rubbery polymeric substrate may exhibit a unimodal particle size distribution or a multimodal distribution, e.g., a bimodal distribution. An exemplary bimodal distribution is one having from 50 to 80 wt % particles having particle sizes within a range of from, e.g., 80 to 180 nm, and 20 to 50 wt % having particle sizes within a range of from, e.g., from 250 to 1000 nm.

In an alternative preferred embodiment wherein the rubbery polymeric superstrate is made by mass polymerization, the rubbery polymeric superstrate is in particulate form and has a weight average particle size of from 50 to 1000 nm, more preferably 50 to 500 nm.

ii. Rigid Polymeric Superstrate

The rigid polymeric superstrate includes repeating units derived monomers selected from the group consisting of ($C_1$–$C_{12}$)alkyl (meth)acrylate monomers, vinyl aromatic monomers and monoethylenically unsaturated nitrile monomers. Suitable vinyl aromatic monomers and monoethylenically unsaturated nitrile monomers are set forth above. As used herein the terminology "($C_1$–$C_{12}$)alkyl (meth)acrylate monomers" refers collectively to acrylate monomers and methacrylate monomers. Suitable alkyl (meth)acrylate monomers include the acrylate monomers disclosed above and their methacrylate analogs such as, e.g., methyl methacrylate, ethyl methacrylate, propyl methacrylate, isopropyl methacrylate, butyl methacrylate, hexyl methacrylate, decyl methacrylate.

In a highly preferred embodiment, the superstrate comprises repeating units derived from one or more monomers selected from styrene, $\alpha$-methyl styrene and acrylonitrile. In a more preferred embodiment, the superstrate comprises from 60 to 90 wt % repeating units derived from styrene and from 10 to 40 wt % repeating units derived from acrylonitrile.

In an alternative highly preferred embodiment, the superstrate comprises repeating units derived from one or more ($C_1$–$C_{12}$)alkyl (meth)acrylate monomers, and may, optionally, further comprise repeating units derived from one or more monomers selected from vinyl aromatic monomers and monoethylenically unsaturated nitrile monomers. In a highly preferred embodiment, the rigid polymeric superstrate comprises greater than or equal to 50 wt % repeating units derived from one or more ($C_1$–$C_{12}$)alkyl (meth)acrylate monomers, more preferably from one or more monomers selected from methyl methacrylate, ethyl methacrylate, propyl methacrylate, isopropyl methacrylate and butyl methacrylate.

The rubbery substrate and the rigid superstrate may each independently include minor amounts, e.g., up to 15 wt % of the total weight of the respective substrate or superstrate, of repeating units derived from one or more other copolymerizable ethylenically unsaturated monomers, provided that the respective $T_g$ limitations are satisfied. Suitable monoethylenically unsaturated monomers that are copolymerizable with the above described monomers include, e.g., monoethylenically unsaturated carboxylic acids such as, e.g., acrylic acid, methacrylic acid, itaconic acid; hydroxy ($C_1$–$C_{12}$)alkyl (meth)acrylate monomers such as, e.g., hydroxyethyl methacrylate; ($C_4$–$C_{12}$)cycloalkyl (meth)acrylate monomers such as e.g., cyclohexyl methacrylate; (meth)acrylamide monomers such as e.g., acrylamide and methacrylamide; vinyl esters such as, e.g., vinyl acetate and vinyl propionate. As used herein, the term "($C_4$–$C_{12}$) cycloalkyl" means a cyclic alkyl substituent group having from 4 to 12 carbon atoms per group and the term "meth)acrylamide" refers collectively to acrylamides and methacrylamides.

The rigid polymeric superstrate may, optionally, include a minor amount, e.g., up to 3 wt %, more preferably up to 1.5 wt %, of repeating units derived from one or more polyethylenically crosslinking monomers. Suitable crosslinking monomers are disclosed above.

The graft copolymer is made according to known processes by polymerizing one or more monomers selected to provide a rigid polymeric superstrate having the desired $T_g$ in the presence of particles of the rubbery polymeric substrate under conditions such that at least a portion of the rigid polymeric superstrate is chemically grafted to the rubbery polymeric substrate by covalent bonds. In a preferred embodiment, the superstrate monomers are polymerized by an aqueous emulsion or aqueous suspension polymerization reaction in the presence of substrate particles and a polymerization initiator system, e.g., a thermal or redox initiator system wherein a portion of the polymerizing chains of the superstrate monomers are chemically bonded, i.e., "grafted" to the substrate via reaction with unsaturated sites in the substrate. The unsaturated sites in the substrate are provided, e.g., by residual unsaturated sites in repeating units derived from a conjugated diene or by residual unsaturated sites in repeating units derived from a graftlinking monomer. In a preferred embodiment, greater than or equal to 30 wt %, preferably greater than or equal to 60 wt %, of the rigid polymeric superstrate is chemically grafted to the rubbery polymeric substrate and less than 70 wt %, preferably less than 40 wt %, of the rigid polymeric superstrate remains non-grafted.

The superstrate may be polymerized in a single step from a suitable monomer or suitable mixture of monomers or may be built up of two or more separately polymerized rigid polymeric superstrate phases of differing composition, e.g., of a methyl methacrylate phase and a separately polymerized styrene phase.

In a first preferred embodiment, the substrate comprises repeating units derived from one or more conjugated diene monomers, and may, optionally, further comprise repeating units derived from one or more monomers selected from vinyl aromatic monomers and monoethylenically unsaturated nitrile monomers, and the superstrate comprises repeating units derived from one or more monomers selected from vinyl aromatic monomers and monoethylenically unsaturated nitrile monomers, such as e.g., acrylonitrile-butadiene-styrene ("ABS") high rubber graft copolymers. Suitable ABS-type high rubber graft copolymers are commercially available, e.g., BLENDEX™ 336 and BLENDEX™ 338 modifiers from GE Specialty Chemicals, Inc.

In a second preferred embodiment, the substrate comprises repeating units derived from one or more ($C_1$–$C_{12}$) alkyl acrylates and the superstrate comprises repeating units derived from one or more monomers selected from vinyl aromatic monomers and monoethylenically unsaturated nitrile monomers, such as e.g., styrene-acrylate ("SA") high rubber graft copolymers and acrylonitrile-styrene-acrylate ("ASA") high rubber graft copolymers. Suitable ASA-type graft copolymers are commercially available, e.g., BLENDEX™ 980 modifier from GE Specialty Chemicals, Inc.

In a third preferred embodiment, the substrate comprises repeating units derived from one or more conjugated diene monomers and may, optionally, further comprise repeating units derived from one or more monomers selected from ($C_1$–$C_{12}$)alkyl (meth)acrylate monomers, vinyl aromatic monomers and monoethylenically unsaturated nitrile monomers, and the superstrate comprises repeating units derived from one or more ($C_1$–$C_{12}$)alkyl (meth)acrylate monomers and may, optionally, further comprise repeating units derived from one or more monomers selected from vinyl aromatic monomers and monoethylenically unsaturated nitrile monomers, such as, e.g., methyl methacrylate-acrylonitrile-butadiene-styrene ("MABS") high rubber graft copolymers, methacrylate-butadiene-styrene ("MBS") high rubber graft copolymers. Suitable MBS-type graft copolymers are commercially available, e.g., PARALOID™ BTA-733 and BTA-753 modifiers from Rohm and Haas Company, Kane Ace B-56 from Kaneka Texas.

In a fourth preferred embodiment, the superstrate comprises repeating units derived from one or more olefin monomers and may, optionally, further comprise repeating units derived from one or more non-conjugated diene monomers, and the superstrate comprises repeating units derived from one or more monomer selected from vinyl aromatic monomers and monoethylenically unsaturated nitrile monomers, such as e.g., acrylonitrile-ethylene-prbpylene-styrene ("AES") high rubber graft copolymers.

In a fifth preferred embodiment, the substrate comprises repeating nits derived from one or more ($C_1$–$C_{12}$)alkyl acrylate monomer and the superstrate comprises repeating units derived from one or more ($C_1$–$C_{12}$)alkyl (meth) acrylate monomer, such as, e.g., acrylic "core-shell" graft copolymers. Suitable acrylic-type graft copolymers are commercially available, e.g., PARALOID™ KM 334 and KM 355 modifiers from Rohm and Haas Company.

Graft copolymers based on substantially fully saturated rubbery polymeric substrates such as, e.g., ASA-type, SA-type, acrylic-type and AES-type graft copolymers, exhibit excellent weatherability, i.e., high resistance to degradation from exposure to sunlight and exposure to cyclic variation in temperature and moisture levels, compared to graft copolymer based on rubbery polymeric substrates having a high degree of residual unsaturation such as, e.g., butadiene rubber-based graft copolymers, and are thus preferred for use in applications that are anticipated to involve exposure to an outdoor environment.

In a very highly preferred embodiment of the elastomer composition, the vinyl aromatic-conjugated diene block copolymer is substantially completely saturated, e.g., by hydrogenation of the residual unsaturation subsequent to polymerization of the copolymer, and the graft copolymer has a rubbery substrate derived from an alkyl acrylate, preferably butyl acrylate, and a superstrate derived from a vinyl aromatic monomer, preferably styrene, and a nitrile monomer, preferably acrylonitrile.

II. Thermoplastic Resin Composition

In a preferred embodiment, the thermoplastic resin composition of the present invention comprises from 60 to 90 wt % of the thermoplastic resin and from 10 to 40 wt % of the elastomer composition.

Suitable thermoplastic resins as well as methods for making the thermoplastic resins are known in the art and such resins include, e.g., polypropylene and poly(1-methyl pentene) homopolymer resins and copolymers of polypropylene or 1-methyl pentene with other monomers, preferably other olefin monomers, such as ,e.g., poly(propylene-ethylene), poly(propylene-butene). In a highly preferred embodiment, the thermoplastic resin is a polypropylene homopolymer.

The elastomer composition and thermoplastic resin composition of the present invention may, optionally, further include an amount, e.g., up to 40 wt % of the total weight of the respective composition, of a polyphenylene ether resin effective to increase the heat distortion temperature of the composition. Suitable polyphenylene ether resins are disclosed in U.S. Pat. No. 4,404,125, and U.S. Pat. No. 4,771,096, the respective disclosures of which are each hereby incorporated herein by reference. In a preferred embodiment, the polyphenylene ether resin comprises repeating units derived from one or more of 2,6-dimethyl phenol, 2,6-dimethyl phenol and 2,3,6-trimethyl phenol.

The respective elastomer and thermoplastic resin composition of the present invention may, optionally, include other additives known in the art, such as, e.g., reinforcing fillers, pigments, dyes, colorants, flame retardants, antistatic agents, plasticizers, oils, lubricants, antioxidants, ultraviolet stabilizers, thermal stabilizers and costabilizers.

The respective elastomer and thermoplastic resin composition of the present invention are each made, e.g., by melt mixing the components, e.g., in a two-roll mill, in a Banbury mixer or in a single screw or twin-screw compounder quipped with kneading elements.

The materials described in the invention can be formed into useful articles by a variety of means such as injection, extrusion, rotation, and blow molding and thermoforming.

The elastomer composition of the present invention is particularly well suited for application low hardness and high elongation in articles such as, e.g., shoe soles, gaskets.

The thermoplastic resin composition of the present invention is particularly well suited for applications requiring impact resistance in articles such as, e.g., thermoformed automotive interior panels, blow molded containers.

The highly preferred embodiment of the elastomer composition of the present invention wherein the vinyl aromatic-conjugated diene block copolymer is substantially completely saturated and the rubbery polymeric substrate of the graft copolymer an acrylate rubber, an ethylene-propylene rubber or an ethylene-propylene-non-conjugated diene rubber, e.g., wherein the graft copolymer is an ASA-type, SA-type, acrylic-type and AES-type graft copolymer, and embodiments of the thermoplastic resin composition of the present invention that include such an elastomer composition are particularly well suited for application in articles intended for outdoor use because of the excellent weatherability exhibited by such compositions.

EXAMPLES

The ABS graft copolymer/SBS block copolymer and ABS graft copolymer/SB block copolymer blends of Examples 1–9 and Comparative Example A were made by melt mixing the vinyl aromatic-conjugated diene block copolymer with the graft copolymer on a laboratory two-roll mill at 171° C. for a time period of 5 minutes. Samples for testing were pressed at 174° C.

Samples of the compositions of Examples 1–9 and Comparative Example A were subjected to the following testing: tensile strength, tensile elongation and tensile modulus according to ASTM D-412; tear resistance according to ASTM D-624, using die C; hardness according to ASTM D 2240 (Shore A and Shore D).

The relative composition of each of the compositions of Examples 1–9 and Comparative Example A, expressed in parts by weight (pbw), tensile strength and tensile yield strength, expressed in pounds force per square inch ("PSI"), tensile elongation, expressed as a percent value ("%"), tear strength and tear yield strength, expressed in pounds force per linear inch ("lbs/in.") and capillary viscosity, as measured at several different shear rates, expressed in Poise are set forth below in TABLE 1.

The thermoplastic resin compositions of Examples 10–21 and Comparative Example B were made by combining a vinyl aromatic-conjugated diene block copolymer and a graft copolymer according to the above-disclosed two-roll milling method and then melt mixing the resultant blend with a thermoplastic polymer using a two-roll mill at 250° C. for a time period of 5 minutes. The thermoplastic resin compositions were subjected to impact testing (⅛" Izod). The relative composition of the compositions of Examples 10–21 and Comparative Example B an the results of the impact testing, expressed in foot pounds per inch ("ft-lb/in.") are set forth below in TABLE 2.

The ASA graft copolymer/hydrogenated SBS block copolymer blends of Examples 22–24 and Comparative Examples C, D and E were made according to the above-disclosed two-roll milling method. The tensile performance of compositions was tested according to ASTM D-412, at a crosshead speed of 20 inches per minute.

The relative compositions of Examples 22–24 and Comparative Examples C, D and E, expressed in pbw, and the test results, i.e., maximum stress, expressed in pounds per square inch ("PSI"), % strain at yield and % strain at break, Young's Modulus (PSI) and stress at 100% strain (PSI), are set forth below in TABLE 3.

The MBS graft copolymer/hydrogenated SBS block copolymer blends of Examples 25 and 26 were made according to the above-disclosed two-roll milling method. Samples of the compositions of Examples 25 and 26 were subjected to the following testing: tensile strength, tensile elongation and tensile modulus according to ASTM D-412; tear resistance according to ASTM D-624, using die C; hardness according to ASTM D 2240 (Shore A and Shore D).

The relative composition of each of the compositions of Examples 25 and 26, expressed in pbw, and the test results, i.e., tensile strength, expressed in pounds force per square inch ("PSI"), tensile elongation, expressed as a percent value ("%"), tear strength and tear yield strength, expressed in pounds force per linear inch ("lbs/in.") are set forth below in TABLE 4.

TABLE 1

| Example # | A | 1 | 2 | 3 | 4 | 5 | 6 | 7 | 8 | 9 |
|---|---|---|---|---|---|---|---|---|---|---|
| SBS1 | 100 | 70 | 50 | 30 | 70 | 50 | — | — | — | — |
| SBS2 | — | — | — | — | — | — | 70 | 50 | 30 | 70 |
| ABS1 | — | 30 | 50 | 70 | — | — | 30 | 50 | 70 | — |
| ABS2 | — | — | — | — | 30 | 50 | — | — | — | 30 |
| Hardness Shore A | 70 | 77 | 80 | 85 | 74 | 76 | 68 | 75 | 83 | 65 |
| Hardness Shore D | 24 | 29 | 33.5 | 38 | 26 | 29 | 21 | 25 | 32 | 19.5 |
| Tensile Strength (PSI) | 1720 | 2646 | 2032 | 1422 | 1944 | 1857 | 475 | 693 | 979 | 564 |
| % Elongation | 1598 | 1197 | 677 | 325 | 1325 | 934 | 681 | 409 | 264 | 1276 |
| Yield Strength (PSI) | 257 | 376 | 447 | 586 | 308 | 337 | 217 | 317 | 501 | 182 |
| % Elongation | 23 | 18 | 14 | 9 | 25 | 20 | 14 | 12 | 9 | 14 |
| Tear Strength (lbs/in.) | 224 | 337 | 391 | 384 | 301 | 333 | 159 | 205 | 284 | 1.45 |
| % Stain @ break | 491 | 265 | 114 | 717 | 360 | 437 | 146 | 94 | 552 | |
| Yield Strength (lbs/in.) | 449 | 674 | 782 | 769 | 602 | 665 | 171 | 163 | 239 | 184 |
| Capillary Viscosity (Poise) | | | | | | | | | | |
| 100 (1/sec) | 48747 | 43475 | 44490 | 46552 | 47598 | 50682 | 18252 | 24049 | 35487 | 17846 |
| 500 (1/sec) | 11984 | 10759 | 10267 | 11823 | 11535 | 12323 | 6506 | 7819 | 10343 | 6450 |
| 1000 (1/sec) | 6396 | 5804 | 5843 | 6486 | 6152 | 6598 | 4079 | 4766 | 6093 | 4042 |

"SBS1" is a polystyrene-polybutadiene-polystyrene triblock copolymer commercially available under the trademark Kraton 1101 from the Shell Chemical Company.
"SBS2" is a polystyrene-polybutadiene diblock copolymer commercially available under the trademark Kraton 1118 from the Shell Chemical Company.
"ABS1" is an acrylonitrile-butadiene-styrene graft copolymer available from General Electric Company under the trademark Blendex 338 having 70 percent of polybutadiene rubber by weight of the graft copolymer.
"ABS2" is an acrylonitrile-butadiene-styrene graft copolymer available from General Electric Company under the trademark Blendex 336 having 65 percent of polybutadiene-styrene rubber by weight of the graft copolymer.

TABLE 2

| Example # | B | 10 | 11 | 12 | 13 | 14 | 15 | 16 | 17 | 18 | 19 | 20 | 21 |
|---|---|---|---|---|---|---|---|---|---|---|---|---|---|
| PP | 100 | 81 | 81 | 76 | 76 | 76 | 71 | 75 | 70 | 75 | 70 | 71 | 66 |
| ABS1 | — | 15 | — | 20 | — | — | — | — | — | — | — | — | — |
| ABS2 | — | — | 15 | — | 20 | 15 | 20 | 25 | 30 | — | — | 25 | 30 |

TABLE 2-continued

| Example # | B | 10 | 11 | 12 | 13 | 14 | 15 | 16 | 17 | 18 | 19 | 20 | 21 |
|---|---|---|---|---|---|---|---|---|---|---|---|---|---|
| SBS1 | — | 4 | 4 | 4 | 4 | — | — | — | — | 25 | 30 | 4 | 4 |
| SBS2 | — | — | — | — | — | 4 | 4 | — | — | — | — | — | — |
| ⅛" Izod (ft-lbs/In.) | 0.93 | 0.91 | 1.42 | 1.01 | 2.28 | 1.49 | 1.37 | 0.95 | 0.96 | 5.88 | 10.4 | 2.84 | 3.2 |

"PP" is a polypropylene resin commercially available under the trademark Profax 6501 (Montell).
The composition B, 10–15 contained a hindered phenolic (0.05 wt % - Irganox 1010 Antioxidant), a phosphite (0.1 wt % - Ultranox 626), a calcium stearate (0.1 wt %) and EBS wax (0.1 wt %).

TABLE 3

| Example # | D | E | 22 | 23 | 24 | C |
|---|---|---|---|---|---|---|
| BC3 | 70 | 50 | 70 | 50 | 30 | 100 |
| ASA3 | 30 | 50 | — | — | — | — |
| ASA4 | — | — | 30 | 50 | 70 | — |
| EBS Wax | 0.3 | 0.3 | 0.3 | 0.3 | 0.3 | 0.3 |
| Hardness, Shore A | 88 | 91 | 72 | 67 | 62 | 76 |
| Hardness, Shore D | 42 | 54 | 27 | 24 | 22 | 28 |
| % Strain @ Yield | 11 | 8 | 27 | 17 | 21 | 732 |
| Tensile St. |  |  |  |  |  |  |
| Max Stress (PSI) | 1551 | 1822 | 2877 | 1253 | 1088 | 4456 |
| % Strain @ Break | 302 | 76 | 1107 | 687 | 702 | 1173 |
| Young's Mod (PSI) | 10817 | 27924 | 3388 | 2628 | 2181 | 3155 |
| Stress @ 100% Strain (PSI) | 1146 | — | 352 | 316 | 282 | 404 |

"BC3" is a styrene/ethylene-butylene/styrene block copolymer (also referred to as hydrogenated styrene-butadiene-styrene block copolymer) commercially available under the trademark KRATON G 1650 from the Shell Chemical Company.
"ASA3" is an acrylonitrile-styrene-butyl acrylate graft copolymer having 35% by weight rubber.
"ASA4" is an acrylonitrile-styrene-butyl acrylate graft copolymer having 75% by weight rubber.

TABLE 4

| Example # | 25 | 26 |
|---|---|---|
| SBS1 | 50 | 50 |
| MBS1 | 50 | — |
| MBS2 | — | 50 |
| Hardness Shore D | 26 | 24 |
| Hardness Shore A | 78 | 80 |
| Tear Strength (lbs/in) | 258 | 246.9 |
| Yield Strength (psi) | 515.9 | 493.7 |
| Tensile Elongation % | 33 | 797 |
| Tensile strength (psi) | 1080 | 1060 |

"MBS1" is a methyl methacrylate-butadiene-styrene graft copolymer available under the trademark Paraloid BTA 753 having at least 70% by weight rubber.
"MBS2" is a methyl methacrylate-butadiene-styrene graft copolymer available under the trademark Paraloid BTA 733 having at least 65 percent by weight rubber.

We claim:

1. An elastomer composition comprising:
    (a) a vinyl aromatic-conjugated diene block copolymer; and
    (b) a high rubber graft copolymer, wherein said graft copolymer comprises:
        (i) from 60 percent by weight to 95 percent by weight of a rubbery polymeric substrate having a glass transition temperature of less than 0° C. and consisting essentially of repeating units derived from one or more ($C_1$–$C_{12}$)acrylate monomers; and
        (ii) from 5 percent by weight to 40 percent by weight of a rigid polymeric superstrate having a glass transition temperature of greater than or equal to 0° C. and consisting essentially of repeating units derived from one or more ($C_1$–$C_{12}$)alkyl (meth)acrylate monomers, wherein at least a portion of the rigid polymeric superstrate is grafted to the rubbery polymeric substrate; and
    wherein the composition comprises from 30 to 70 percent by weight of the block copolymer and from 30 to 70 percent by weight of the graft copolymer.

2. The composition of claim 1, wherein the block copolymer is a polystyrene-polybutadiene block copolymer, a polystyrene-polybutadiene-polystyrene block copolymer or a polystyrene-poly(ethylene-butylene)-polystyrene block copolymer.

3. The composition of claim 2, wherein the vinyl aromatic-conjugated diene block copolymer is substantially fully saturated.

4. The composition of claim 1, wherein the substrate consists essentially of repeating units derived from butyl acrylate and the superstrate consists essentially of repeating units derived from methyl methacrylate.

5. The composition of claim 1, wherein the graft copolymer comprises from 65 to 90 percent by weight of the substrate and from 10 to 35 percent by weight of the superstrate.

6. The composition of claim 1, wherein the composition comprises from 40 to 70 percent by weight of the block copolymer and from 30 to 60 percent by weight of the graft copolymer.

7. The composition of claim 1, wherein greater than or equal to 60 weight percent of the rigid polymeric superstrate is grafted to the rubbery polymeric substrate.

8. The composition of claim 1, wherein the rubbery polymeric substrate exhibits a multi-modal distribution.

9. An elastomer composition comprising:
    (a) a vinyl aromatic-conjugated diene block copolymer; and (b) a high rubber graft copolymer, wherein said graft copolymer comprises:
  (i) from 60 percent by weight to 95 percent by weight of a rubbery polymeric substrate having a glass transition temperature of less than 0° C. and comprising repeating units derived from one or more ($C_1$–$C_{12}$)acrylate monomers; and
  (ii) from 5 percent by weight to 40 percent by weight of a rigid polymeric superstrate having a glass transition temperature of greater than or equal to 0° C. and consisting essentially of repeating units derived from one or more ($C_1$–$C_{12}$)alkyl (meth)acrylate monomers, wherein greater than or equal to 30 weight percent of the rigid polymeric superstrate is grafted to the rubbery polymeric substrate; and wherein the composition comprises from 30 to 70 percent by weight of the block copolymer and from 30 to 70 percent by weight of the graft copolymer.

10. The composition of claim 9, wherein greater than or equal to 60 weight percent of the rigid polymeric superstrate is grafted to the rubbery polymeric substrate.

11. The composition of claim 9, wherein the graft copolymer comprises from 65 to 90 percent by weight of the substrate and from 10 to 35 percent by weight of the superstrate.

12. The composition of claim 9, wherein the composition comprises from 40 to 70 percent by weight of the block copolymer and from 30 to 60 percent by weight of the graft copolymer.

13. The composition of claim 9, wherein the rubbery polymeric substrate exhibits a multi-modal distribution.

14. An elastomer composition consisting essentially of:
  (a) a vinyl aromatic-conjugated diene block copolymer; and
  (b) a high rubber graft copolymer, wherein said graft copolymer consists essentially of:
    (i) from 60 percent by weight to 95 percent by weight of a rubbery polymeric substrate having a glass transition temperature of less than 0° C. and consisting of repeating units derived from one or more ($C_1$–$C_{12}$)acrylate monomers; and
    (ii) from 5 percent by weight to 40 percent by weight of a rigid polymeric superstrate having a glass transition temperature of greater than or equal to 0° C. and consisting essentially of repeating units derived from one or more ($C_1$–$C_{12}$)alkyl (meth)acrylate monomers, wherein at least a portion of the rigid polymeric superstrate is grafted to the rubbery polymeric substrate; and
  wherein the composition comprises from 20 to 80 percent by weight of the block copolymer and from 20 to 80 percent by weight of the graft copolymer.

15. The composition of claim 14, wherein the substrate consists essentially of repeating units derived from butyl acrylate and the superstrate consists essentially of repeating units derived from methyl methacrylate.

16. The composition of claim 14, wherein the composition comprises from 30 to 70 percent by weight of the block copolymer and from 30 to 70 percent by weight of the graft copolymer.

17. The composition of claim 14, wherein the composition comprises from 40 to 70 percent by weight of the block copolymer and from 30 to 60 percent by weight of the graft copolymer.

18. The composition of claim 14, wherein greater than or equal to 30 weight percent of the rigid polymeric superstrate is grafted to the rubbery polymeric substrate.

19. The composition of claim 14, wherein the rubbery polymeric substrate exhibits a multi-modal distribution.

* * * * *